2 Sheets—Sheet 1.
H. DAVENPORT.
Cutting Soft Rubber Thread.
No. 16,269.  Patented Dec. 23, 1856.
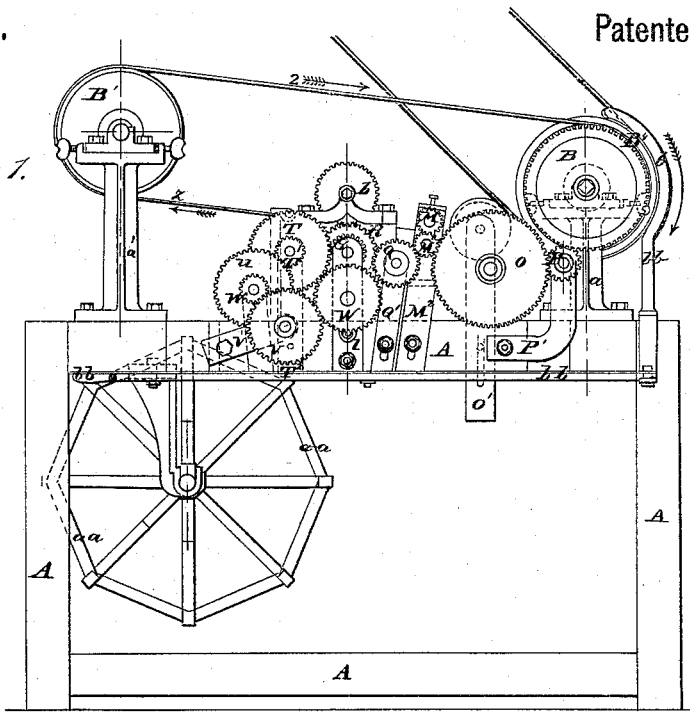
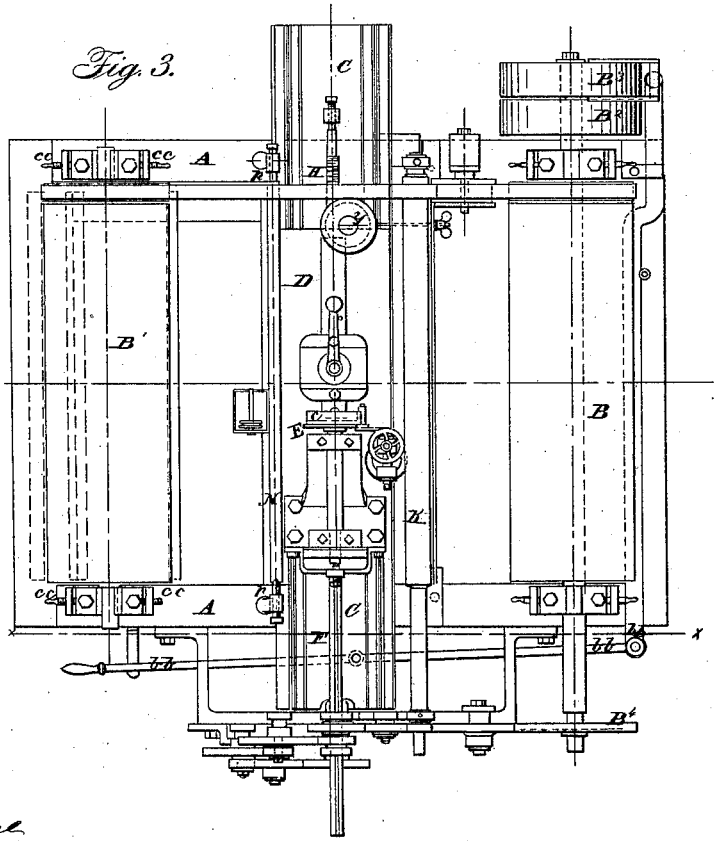
Witnesses:  Inventor:

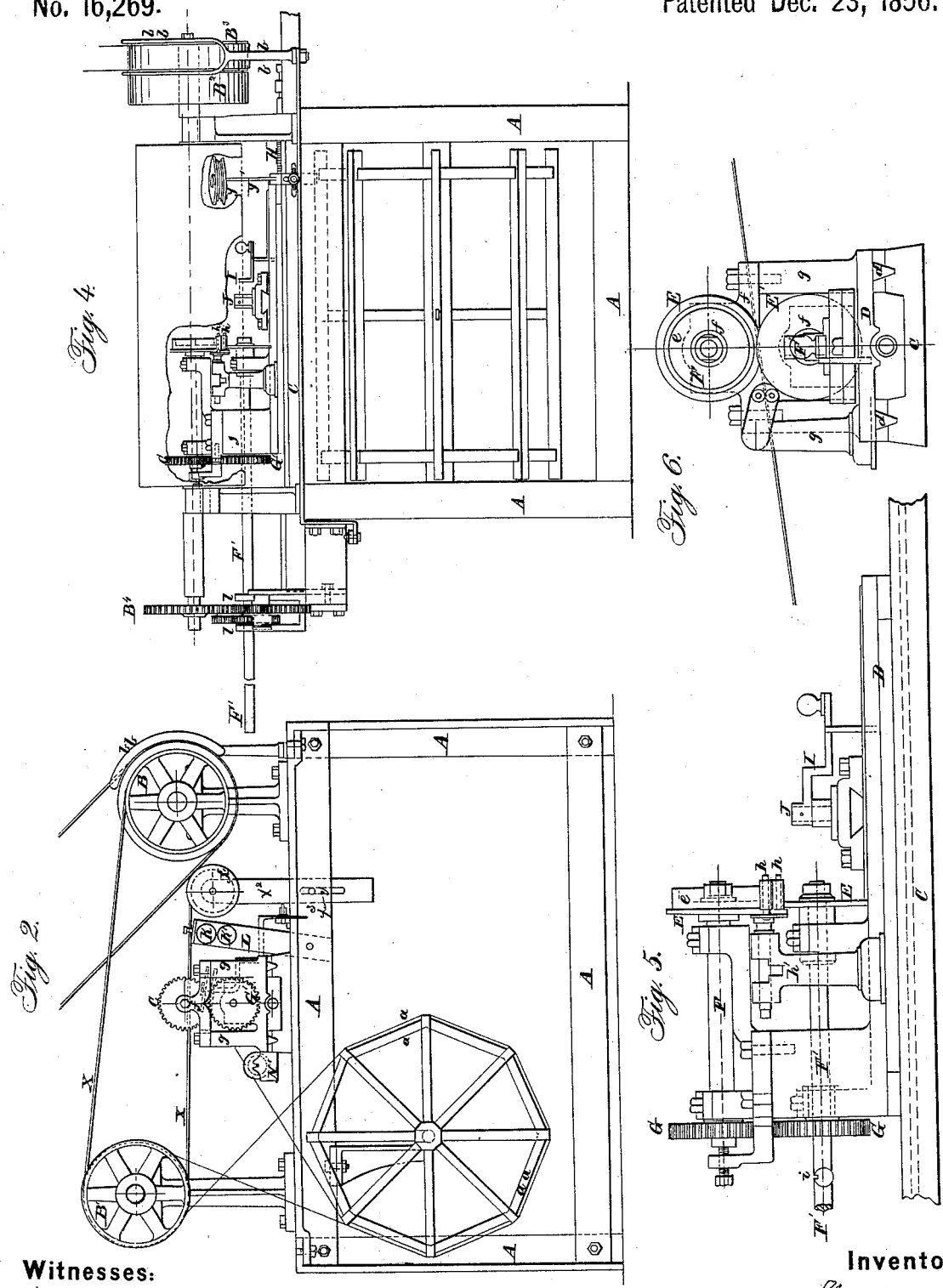

UNITED STATES PATENT OFFICE.

HENRY DAVENPORT, OF NEW YORK, N. Y.

MACHINE FOR CUTTING INDIA-RUBBER THREAD.

Specification of Letters Patent No. 16,269, dated December 23, 1856.

*To all whom it may concern:*

Be it known that I, HENRY DAVENPORT, of the city of New York, manufacturer of india-rubber goods, have invented a new and useful Improvement in Making India-Rubber Thread; and I do hereby declare the following to be a full and exact description thereof, reference being had to the accompanying drawings, making part of this specification.

The nature of my invention consists in the cutting of india rubber thread by means of and from rubber made into an endless belt or fillet strained or drawn over two or more rollers or cylinders which when revolving carry the edges of the belt to rotary knives or cutters which cut the edges off into thread and carry on the process until the belt or fillet is converted into thread.

In the accompanying drawings, Figure I, represents a side elevation of the machine showing the gearing wheels and ends of the cylinders and rollers and part of the frame and standards. Fig. II represents an elevation of the machine from the same side as Fig. I, leaving off the gearing and spur wheels and their uprights and fastenings. Fig. III, represents a top view or horizontal elevation. Fig. IV, represents a cross vertical section of the machine at the points indicated by the red line on Fig. III. Fig. V, represents a vertical longitudinal section of the axles, the two gearing wheels and standards of the rotary knives or cutters and the cutters themselves and two small regulating rollers; also the sliding table of the cutters and apparatus for connecting or disconnecting the sliding table with the feed screw. Fig. VI, represents a side elevation of the knives or cutters in position with the edge of the rubber between their cutting edges; also a cross section of the uprights and frame of the carriage for carrying the cutters and of the platform or way, upon which the table traverses.

Similar letters represent similar parts in all the figures.

The drawings are upon a scale of two inches to the foot, for an ordinary sized working machine.

The machinery is placed upon an oblong rectangular frame A which should be firm and substantial so as not to jar or vibrate and should be made of iron. Upon this frame near the opposite ends are placed two hollow cylinders or drums B, B'. These drums have their axles extended beyond their heads so as to form journals, resting on journal boxes *c, c*, placed on the top of the uprights *a a'* at each head of the cylinders. These cylinders must be true cylinders have smooth surfaces and the sides or peripheries of the two cylinders must be in true parallel with each other, the cylinder B' being placed a little higher than the cylinder B so as to give an upward inclination to the belt of rubber placed or drawn over the cylinders in passing from the cutters. The journal boxes of the cylinders are made adjustable by thumb or adjusting screws operating upon slides, by which the cylinders are adjusted and made true to each other, and at the precise distance from each other required.

Midway between the two cylinders, and across the frame is placed a platform C. This platform sustains a sliding table D, which traverses upon the platform, having underneath on either side of the sliding table projections *d, d*, Figs. V, VI, which fit into corresponding grooves on either side of and running the whole length of the platform, to keep the table in a straight and uniform line when moving. This sliding table carries the two circular knives or cutters by which the thread is cut from the india rubber. These cutters E, E', are shown in Figs. V and VI, a side elevation Fig. VI, an end elevation in Fig. V. They are made of steel with sharp cutting edges, the cutting edge of the upper lapping slightly the cutting edge of the lower cutter and one edge should face the other at a very slight angle so as to cross their faces like the blades of a pair of shears, the inclination being on the side of the cutters which meets the belt from which the thread is cut. To the outer face of the cutters are attached brass disks *e* the peripheries of which are just within the cutting edges of the cutters to which they are attached; they are considerably thicker than the cutting knives and serve to support and hold steady and even the rubber. The cutters are attached to axles F, F' which revolve in journal boxes in the supporting cross pieces *f f*, at either end of the sliding table, and which rest upon the uprights *g, g*. To the end of the axle F, opposite to the end carrying the cutter is a spur wheel G which works into a spur wheel of the same pitch and diameter as G, and which is attached to the axle of the lower cutter E. Upon the platform C and under the sliding table is placed the feeding screw H which extends nearly the whole length of the platform. It is connected to the table upon the under side by movable jaws having screw threads to correspond with the feed screw, and which are shut upon it or disconnected by an eccentric or bar attached to the jaws worked by the arm I, Figs. IV, V, operating upon the pin J, attached to the eccentric or bar.

The lower axle F′ is prolonged and carries a spur wheel and pinion which are connected with the series of gearing wheels and pinions which give movement to the machine as hereafter described. This axle is also grooved or slotted in a straight line through its whole length, the slot being shown as in section at $i$ Fig. V. This slot is for receiving a feather or key passing into it from the spur and pinion R, S, Fig. I, by which it is geared and also receives motion so as to allow it the axle to move along with the sliding table and cutter to which it is attached, and at the same time to revolve. This axle passes through two uprights $l, l$, Fig. IV, by which it is supported and kept in a true line while traversing and revolving. In front of the edges of the two rotary cutters when their edges meet and fastened to an upright $a'$ secured to the moving table are placed two small rollers one above the other $h, h$, Figs. IV, V, and so near together that they will touch the rubber on either side; their purpose is to keep that part of the rubber belt which is about to be cut true and even and at a constant line of inclination to the cutters. The axles of these rollers are fastened at one end only so that the rubber will slip between the rollers at the other. In front of these two small rollers and between them and the drum B, are two solid rollers or cylinders of iron, the upper of which is seen at K, Fig. III. They are of even size and are turned true and set parallel to each other and to B. They extend across the machine, and are placed one above the other, and so near together as to touch the rubber on either side. They are supported by pairs of uprights one of which is seen at L, Fig. II. The ends of the two rollers are seen at $k, k'$, Fig. II. Both have pinions the upper driven by the lower M, M′ Fig. 1. These rollers revolve with like speed and their purpose is to carry the sheet or belt of rubber evenly toward the cutters and keep it in a uniform position and horizontal surface. The upper roller K is made to take off at pleasure so as to admit the side of the belt of rubber between the two rollers, by means of adjustable covers or top pieces which may be secured by screws or keys.

On the opposite side of the sliding table is placed a single adjustable iron roller seen at N, Fig. III. It is supported on two uprights one of which is seen at N′, Fig. II, and its purpose is to receive the rubber from the cutters in an even and uniform line and in connecting with the other rollers to hold and present the rubber steady and true to the cutters while operating upon it.

The gearing by which motion is given to the different parts is as follows. The axle of the drum B is prolonged at either end. At the end $B^2$ is a pulley secured to the axle for receiving the driving belt by which the power is communicated. It has a loose pulley $B^3$ for disengaging the driving belt. At the opposite end of the axle of B is a spur wheel $B^4$, Figs. I and IV, which gears into the small pinion P which is also geared into the spur O which is geared into pinion M′, which last is geared into the larger spur wheel Q which is geared into the pinion R of the axle F′ by which the cutters are driven. By the side of Q and upon the same axle is a small pinion S′ which communicates motion through the spur wheels T, U, V and the two pinions T′ and U′ to the spur W which is attached to the end of the feed screw H before described, and gives it rotation, and reducing the speed to the degree required for cutting the required size of thread. The gearing wheels and pinions are supported upon arms and standards secured to the main frame but projecting from it so as not to interfere with the sliding table and its platform and appendages. These supports and standards are seen in Fig. I at P′, O′, $M^2$, $T^2$, Q′, and V′. In the machine described the thread cut is about 42 to 44 to the inch. The drums or cylinder B, B′ are geared together by a band or cord $x$, Fig. II, at the ends running in grooves, and which is kept clear of touching roller K by the grooved vertical wheel $x'$, supported by the upright $x^2$ by means of a slot $x^3$ through which a screw passes into the frame.

The speed of the two guiding rollers M, M′, is a little greater than that of cylinder B. The cutters revolve with a speed a trifle greater than that of B, while the speed of W which turns the feed screw is very greatly reduced. The speed of the feed screw must be regulated according to the size of the thread required; the speed being the more reduced as the thread is required to be finer and increased when the thread is required to be coarser. To prepare the machine for operation the endless belt or fillet of rubber is carefully prepared and made of uniform thickness, with its edges as parallel and even as possible, and placed or drawn over the cylinders B, B′ by taking the cylinders out of their places. The upper of the two rollers M, M′ is also lifted off and the side of the rubber being placed over the lower roller, is replaced. The sliding table with its appendages is placed at the beginning of the feed of the screw and the jaws are closed upon the screw. The roller N slightly presses upward upon the rubber as it revolves. The edge of the rubber to be cut is inserted between the two small guide rollers h h Fig. 4. The belt of rubber should be placed as true and even as possible upon the drums B, B′ with an even strain or tension throughout, which is effected by the adjusting screws and slides c c, Fig. III, in the journal boxes. A small grooved horizontal wheel y is supported by an adjustable spring rod y′, Figs III, IV. The edge of the rubber opposite to that which is being cut is placed in the groove of this wheel, and serves to keep the rubber in its place and counteracts any tendency of the rubber to draw away from the cutters. The rubber belt or fillet is seen in position at z, Fig. 1.

It should be observed that the breadth of the rubber belt or fillet cannot be greater than the distance which the sliding table can travel; it may be of less width as the cutters can be brought up to its edge however narrow the belt may be. Under B′ in the lower part of the frame is hung a bell a a Figs. I II, which receives and winds the thread as it comes from the cutters; it is made to revolve by an endless cord or narrow belt passing around it and B′ as seen in Figs. I, II, III, IV, at b b.

The drum B, and the rubber belt while being cut are carried in the direction indicated by the arrows; and the drum B being in motion carries the spur wheel attached to its axle by which motion is communicated to the rotary knives through the medium of the gearing wheels as described; the sliding table with the cutters advancing at the same time uniformly so as to keep the cutters continuously and evenly operating upon the edge of the rubber belt; and thus the operation proceeds until the rubber belt is entirely cut up into thread.

Having thus described my invention and the machinery by which it is carried into effect and the manner of making and operating the same, what I claim as my invention and which I desire to secure by Letters Patent is—

The combination of the cylinders or drums B, B′, over which the endless belt of india rubber from which the thread is to be cut is stretched, with the revolving circular cutters E, E′, attached to the table D,—the whole arranged, constructed and operating in the manner above described.

HENRY DAVENPORT.

Witnesses:
RICHARD WINNE,
J. B. STAPLES.